July 25, 1961 L. F. VILLAR 2,993,673
MULTI-DIRECTIONAL SHOCK MOUNT
Filed April 11, 1958
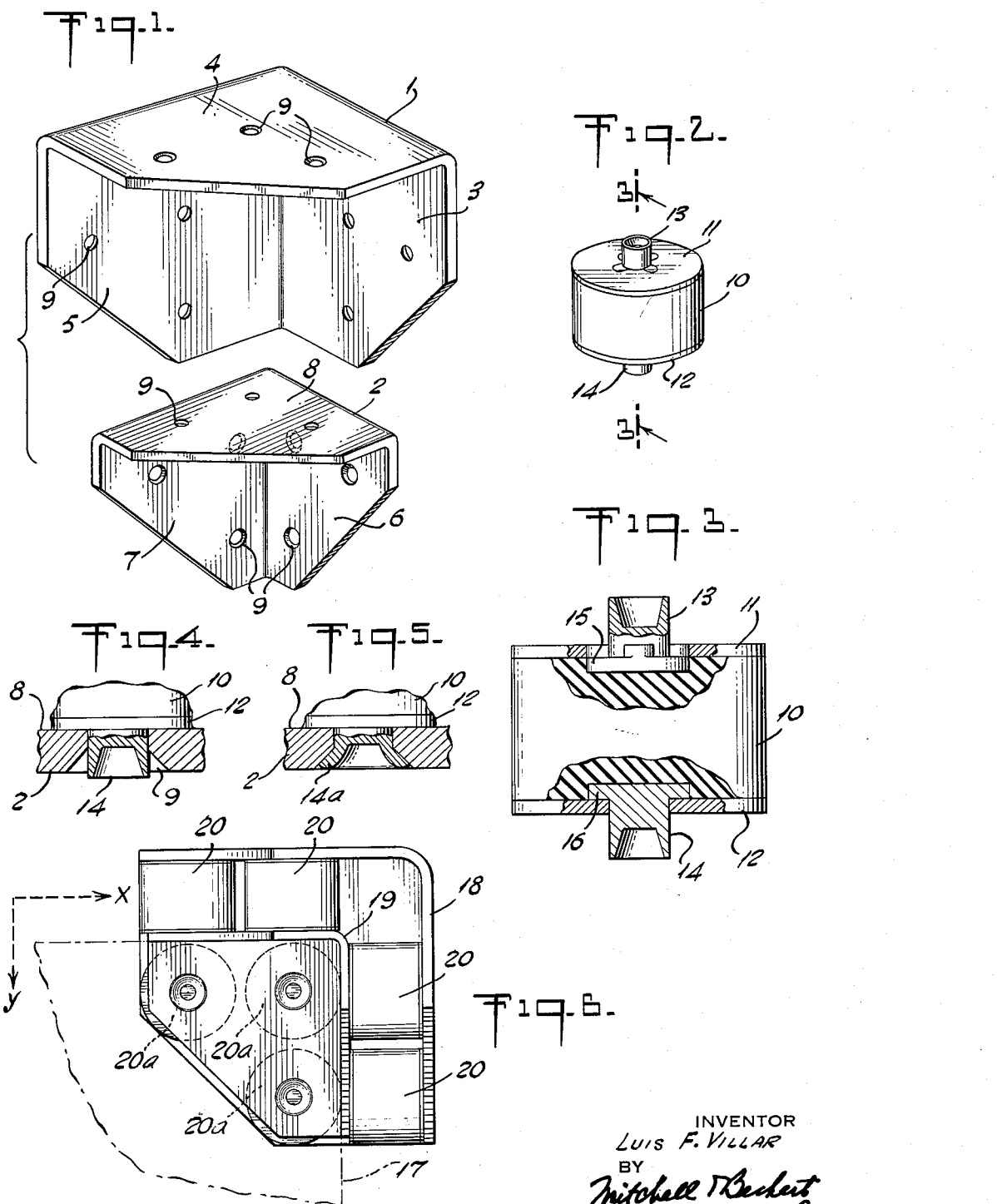
INVENTOR
LUIS F. VILLAR
BY
Mitchell T Beckett
ATTORNEYS

United States Patent Office 2,993,673
Patented July 25, 1961

---

2,993,673
MULTI-DIRECTIONAL SHOCK MOUNT
Luis F. Villar, Westbury, N.Y., assignor to Servo Corporation of America, New Hyde Park, N.Y., a corporation of New York
Filed Apr. 11, 1958, Ser. No. 727,987
2 Claims. (Cl. 248—358)

This invention relates to a multi-directional shock-absorbing means and in particular to a shock-absorbing element of simple construction characterized by a plurality of vibration-absorbing units mounted to form a unitary structure adapted to absorb vibration or other mechanical stresses in a plurality of directions. The invention also relates to a vibration-resistant mechanical structure having corners by which said structure is supported, said corners having in cooperative relation therewith multi-directional shock-absorbing elements provided by the invention.

In the instrumentation field, it is important that sensitive recording elements and electrical components associated therewith be substantially isolated from vibrational or other forms of mechanical stresses which adversely affect the operation of such instruments and/or components. Generally, sensitive recording elements are contained within or are supported upon mechanical structures which in turn are connected to other structures within the immediate environment. Thus, any vibrations or shock wave arising within or from without the environment may be transmitted to the structure supporting the sensitive instrument, and, unless the supporting structure is adapted with efficient shock-absorbing means to resist the effects of vibration, the instrument and the sensitive electrical components may be adversely affected.

Similar problems prevail with respect to supporting sensitive electronic equipment, photographic and television apparatus, and the like.

One common means which is employed as a shock-absorbing element is the use of springs for floatingly supporting sensitive components. Springs are limited in their application in that while they will substantially dampen high level vibrations, they are still apt to vibrate sufficiently to affect adversely the operation of the more sensitive components. In addition, tension springs may not always assure damping in all directions.

The present invention overcomes the deficiencies inherent in prior shock-absorbing devices by providing a simply constructed multi-directional shock-absorbing element having a high absorption efficiency in all directions.

The element provided by the invention is adapted for use as a corner-supporting means for structures made up of, containing, or having associated therewith vibration-sensitive components. In its broader aspects, it comprises an outer mounting or bracket having a plurality of angularly disposed legs or faces and an inner mounting of similar configuration spaced apart from but in substantially nesting relation therewith, whereby the faces of one mounting are disposed opposite to corresponding faces of the other. The inner mounting is joined to the outer mounting somewhat rigidly at their corresponding opposed faces via compressible resilient means, preferably blocks of elastomeric material such as natural or artificial rubber.

By using an angular bracket with three faces disposed at right angles to each other for both the inner and outer mounting and a plurality of vibration-absorbing units comprised of massive rubber blocks between and integral with the corresponding bracket faces, vibration absorption in three directions at right angles to each other is assured.

The advantages of the invention will more clearly appear from the following disclosure taken together with the accompanying drawings, wherein:

FIG. 1 depicts in three dimensions the inner and outer mounting or shell employed in producing the shock-absorbing element;

FIG. 2, likewise in three dimension, shows a shock-absorbing unit comprising a cylindrical rubber block with opposed connecting means on the flat faces thereof;

FIG. 3 is similar to FIG. 2 but shows in partial cross-section the detail structure of the opposed connecting means;

FIGS. 4 and 5 illustrate how the shock-absorbing units are connected to the surfaces of the mounting; and FIG. 6 shows in plan view how the shock-absorbing element is used in cooperation with a corner of a structure being supported.

Referring now to the drawing, FIG. 1 shows the outer and inner brackets or shells 1, 2 respectively, employed in the production of the shock-absorbing element. As shown, both brackets are similarly configurated as right angled corners, bracket 1 comprising a cold pressed metal angle with three faces 3, 4 and 5 at right angles to each other and bracket 2 having corresponding faces 6, 7 and 8.

Each of the faces on the brackets are provided with three chamfered holes 9 by means of which shock-absorbing units of rubber are integrally connected thereto via hollow expansion rivets. The shock-absorbing unit is shown in FIG. 2 as comprising a cylindrical rubber block 10 sandwiched integrally between metal discs 11 and 12 having passing therethrough hollow rivets 13 and 14 as shown in more detail in the partial cross-section of FIG. 3 taken along line 3—3 of FIG. 2 in the direction of the arrows.

Both rivets are characterized by flat heads 15 and 16, the overhanging portions of which abut the under surface of each disc. The cylindrical rubber block with a shallow cylindrical hole conforming to the rivet heads is bonded to both of said disc surfaces and the rivet heads by means of rubber cement to form the shock absorbing unit shown in FIG. 3. The units are connected to the inner and outer bracket mountings by means of rivets 13 and 14 which pass through corresponding chamfered holes 9 in brackets 1 and 2.

For illustrative purposes, rivet 14 is shown passing through chamfered hole 9 of face 8 of inner bracket 2, the rivet being expanded or pressed in place as shown by expanded portion 14a in FIG. 5 in accordance with the contour of the chamfer. Rivet 13 is similarly fixed in place in the outer bracket. In the preferred embodiment, each face has three shock-absorbing units connected thereto, making a total of nine in all for the element. Thus, shock-absorbing means are provided in the element in three different directions at right angles to each other.

The use of the shock-absorbing element is shown as applied to one of the corners of a structure 17, the element comprising outer bracket 18 rigidly joined to inner bracket 19 via shock-absorbing units 20 connected to the faces of the brackets as aforesaid. That portion of the bracket which fits on the underside of the corner of the structure is shown in dotted lines as having three shock absorbing units 20a. Along the sides of the corner bracket, only two units 20 are visible, the third being hidden from view. Looking at FIG. 6, it will be noted that shock can be absorbed in one or more of three directions: in the directions of X, Y and in a direction perpendicular to the plane of the drawing. A mechanical structure such as a box containing sensitive instruments, a shock-absorbing element at each of the eight corners, assuming all sides of the box touch another structure, will provide the necessary resistance to vibration.

As has been stated, the shock-absorbing units are constructed of compressible resilient material. By resilient material, insofar as the invention is concerned, is meant material having the property of recovering substantially its original shape when pressure is removed or tension released. Such materials should preferably have elastomeric properties, for example natural rubber. Artificial rubbers (e.g. certain plastic compositions) are likewise included. Examples of artificial rubber having elastomeric properties include butadiene-styrene (GR-S), butadiene acrylonitrile, chloroprene (neoprene), butyl rubber (isobutylene-isoprene), certain types of silicone rubbers, and the like. In carrying out my invention, I prefer to use blocks of natural rubber.

While the invention has been described with respect to a certain preferred embodiment which gives satisfactory results, it will be understood by those skilled in the art after understanding the invention, that various changes and modifications may be made without departing from the spirit and scope of the invention and it is intended therefore to cover all such changes and modifications in the appended claims.

I claim:

1. As an article of manufacture, a three-coordinate shock-absorbing corner mount, comprising an outer corner bracket member formed of three mutually perpendicular plane surfaces, said three plane surfaces intersecting each other to form a substantially closed corner, an inner corner bracket member formed of three mutually perpendicular plane surfaces intersecting to form a corner to fit in nesting and special relationship with said outer corner bracket, the inner corner of said inner corner bracket being adapted to receive the corner of an article to be mounted, first elastomeric block means secured on opposed sides thereof between said inner and outer bracket members only to first opposed surfaces of said inner and outer bracket members, second elastomeric block means secured on opposed sides thereof between said inner and outer bracket members only to second opposed surfaces of said inner and outer brackets, and third elastomeric block means secured on opposed sides thereof between said inner and outer bracket members only to the third opposed surfaces of said inner and outer brackets, whereby first, second and third essentially independent and mutually perpendicular resilient shock-absorbing axes are defined by said respective block means so that severe shock loads normal to a corner are absorbed by said mount.

2. The article of claim 1, in which the respective areas of each of said bracket surfaces projects to exceed the effective area of contact with said block means, and article securing means on each of said brackets at projecting areas thereof.

References Cited in the file of this patent

UNITED STATES PATENTS

| | | |
|---|---|---|
| 2,060,604 | Bartlett | Nov. 10, 1936 |
| 2,361,529 | Briggs | Oct. 31, 1944 |
| 2,376,530 | Dittmann | May 22, 1945 |
| 2,560,249 | Risch | July 10, 1951 |
| 2,740,368 | Irgens | April 3, 1956 |

FOREIGN PATENTS

| | | |
|---|---|---|
| 23,953 | Great Britain | of 1902 |
| 320,467 | Switzerland | May 15, 1957 |

UNITED STATES PATENT OFFICE
CERTIFICATE OF CORRECTION

Patent No. 2,993,673                                           July 25, 1961

Luis F. Villar

It is hereby certified that error appears in the above numbered patent requiring correction and that the said Letters Patent should read as corrected below.

Column 3, line 27, for "special" read -- spacial --.

Signed and sealed this 2nd day of January 1962.

(SEAL)
Attest:

ERNEST W. SWIDER                                        DAVID L. LADD
Attesting Officer                                           Commissioner of Patents